United States Patent Office 2,867,511
Patented Jan. 6, 1959

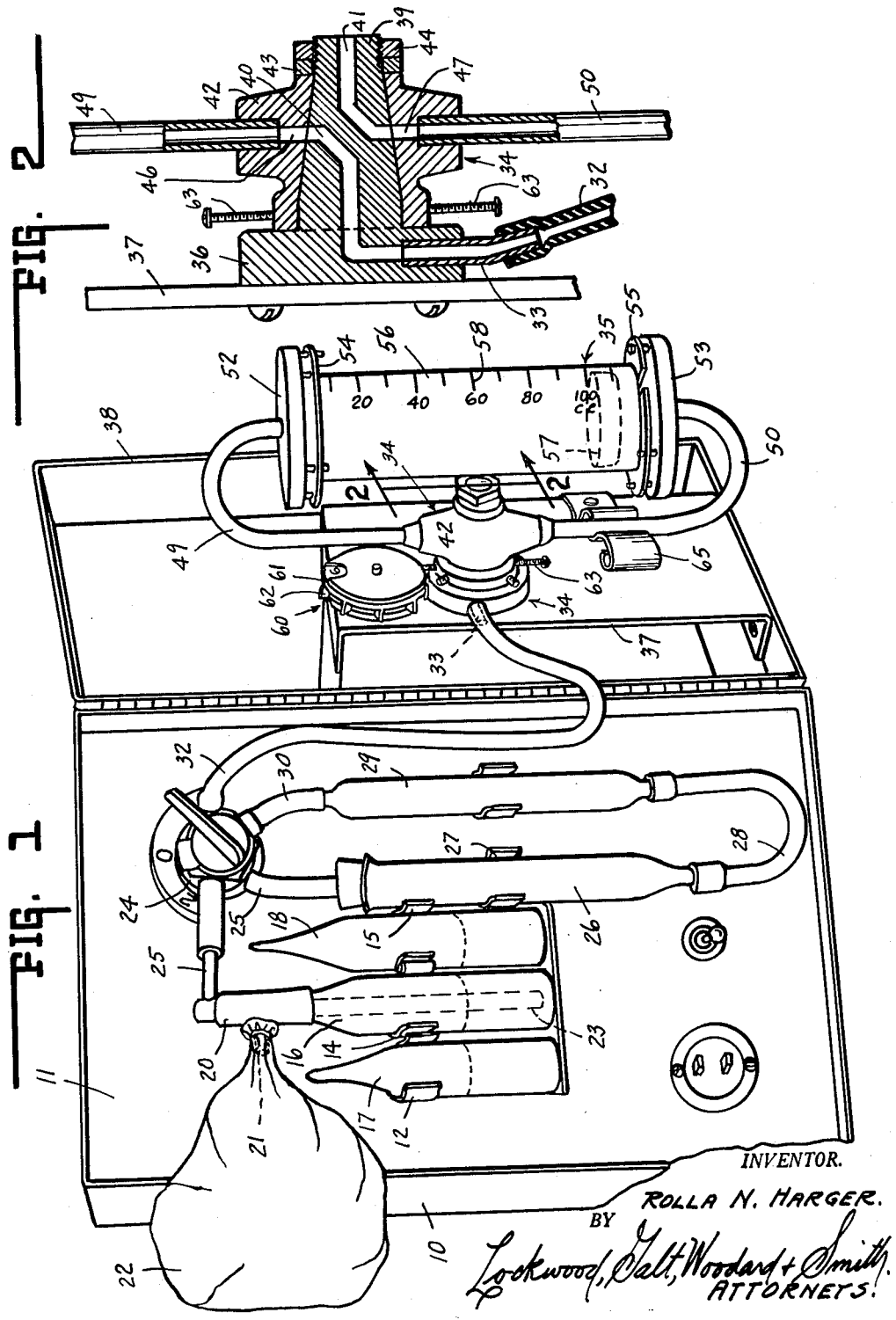

2,867,511

APPARATUS FOR MEASURING ALCOHOL CONTENT OF GASES

Rolla N. Harger, Indianapolis, Ind., assignor to Indiana University Foundation, Bloomington, Ind., a corporation of Indiana not for profit Application July 29, 1955, Serial No. 525,311

9 Claims. (Cl. 23—254)

This invention relates generally to apparatus for measuring alcohol content of gases, and more particularly relates to apparatus for measuring alcohol content of the human breath and including a gravity operated pump of such character that precise quantities of breath may be drawn through the measuring apparatus.

In my U. S. Letters Patent No. 2,062,785, granted December 1, 1936, there is disclosed apparatus and a process adapted to determine the alcohol concentration in the blood of live animals. This invention is an improvement over the apparatus and process disclosed in my prior patent.

In using the patented apparatus it was necessary to provide a container such, for example, as a test tube having a preparation of sulphuric acid, water and permanganic acid which would produce a predetermined color change upon exposure to ethyl alcohol or alcoholic vapor. In utilizing this test tube it was necessary for a police officer, for example, to have a supply of the sulphuric acid and water mixture, but since the use of the apparatus is relatively infrequent the sulphuric acid solution sometimes aged or oxidized and became discolored so that the results of a test of a person's breath were not reliable. For example, the test liquid had a reddish purple color, and upon the passage of sufficient ethyl alcohol vapor through the liquid the liquid assumes a clear or very faint brown color. If the sulfuric has aged or oxidized this color change may occur without alcohol being present.

Accordingly, it is one of the objects of this invention to provide a measuring apparatus adapted to use sealed ampoules of the sulfuric acid, thereby to eliminate the error resulting from prolonged storage of test fluid.

In order to obtain an accurate test or measurement with respect to the alcohol content of human breath it is advantageous to use alveolar breath, which may be defined as breath from the alveoli of the human lungs. In order to accomplish the collection of the desired amount of alveolar breath, the person rebreathes air by exhaling and inhaling into a closed container through a number of successive cycles.

In using my patented device it was customary to provide the person being tested with a balloon to be blown up and then attached to the apparatus for exhaustion of the sample. In using a balloon, it was impossible to obtain a sample of breath containing only alveolar air. Accordingly, another object of this invention is to provide apparatus for measuring alcohol content of the human breath, of such character that a non-elastic bag may be used for taking samples of human breath.

Again referring to my patent, apparatus is provided for pumping air through a container of reagent and utilizing a quantity of air necessary to discolor the reagent as a measure of the alcohol concentration in the breath. The nature of the pump in my prior patent was such that it was difficult to obtain a precise measurement of the quantity of air required to change the color of the reagent. Furthermore, the pump was relatively bulky and expensive.

A further object of this invention is to provide pumping apparatus adapted to draw one definite quantity after another of breath through the measuring apparatus and to provide a visual indication of the amount of air necessary to discolor the reagent.

In accordance with this invention there is provided apparatus for measuring alcohol content of the human breath comprising a non-elastic container for holding a sample of breath under atmospheric pressure, a means coupled to said container for providing a visual indication of a predetermined quantity of alcohol in the breath, and a gravity operated pump operable through one pumping cycle after another to measure and indicate the quantity of breath necessary to provide said predetermined quantity of alcohol.

In accordance with another feature of this invention there is provided a gravity operated pump having a cylinder, a gravity movable piston within said cylinder, and a means for supporting the cylinder for rotation about a horizontal axis having a rotatable two-way valve coupled to each end of the cylinder for opening the lower end of the cylinder to atmosphere and the upper end of the cylinder to a source of gas or fluid.

The full nature of the invention will be understood from the accompanying drawings and the following description and claims.

Fig. 1 is a perspective view of the apparatus provided in accordance with this invention.

Fig. 2 is a cross-section of the rotatable valve taken on line 2—2 of Fig. 1.

Referring to the drawings, the apparatus provided in accordance with this invention comprises a case 10 on the wall 11 of which may be mounted a number of clips 12, 14 and 15. The quantity of blood alcohol may be measured by passing alveolar breath through a solution of sulphuric acid and potassium permanganate which normally has a purple color and will be de-colorized when a predetermined amount of alcohol is absorbed by the sulphuric acid. An ampoule 16 may be supported in clip 14 for holding this reagent. In order to obtain a color comparison after the reagent absorbs alcohol there is provided in the clip 12 an ampoule 17 having a solution of a standard yellow color. Another ampoule 18 may be carried by clip 15 and it has a solution of standard pink color. A predetermined quantity of alcohol absorbed in the reagent in ampoule 16 fades the purple solution to a color between those of the two standards.

The ampoule 16 may be fitted with tube 23 extending downwardly into the reagent and a rubber hose connection 20 to which may be connected a sampling tube 21 which in turn may be connected with a non-elastic breath sampling bag 22. The tube 20 is also connected to a manually operable valve 24 by means of a tube 25.

Valve 24 is a two-way valve of conventional construction having an output tube 25 connected to a dehydrating tube 26 supported on the panel 11 by means of a clip 27. The tube 26 may have therein a suitable dehydrating material such, for example, as anhydrous calcium chloride or anhydrous magnesium perchlorate.

The lower end of tube 26 may be connected through a tube 28 with an "Ascarite" tube 29 coupled at its other end to the valve 24 through a tube 30. Tube 29 is provided with a quantity of Ascarite for absorbing carbon dioxide from the alveolar breath. After a test this tube can be weighed to determine the amount of carbon dioxide from the alveolar breath containing a predetermined quantity of alcohol.

The outlet port of valve 24 may be connected through a tube 32 with the inlet port 33 of the rotatable two-way valve 34. Valve 34 is utilized to connect a gravity pump 35 with tube 32 for successively drawing one quantity of alveolar breath after another through the measuring apparatus.

Valve 34 includes a base 36 which may be secured to the bracket 37 fastened in any suitable manner to the cover 38 of case 10. The base 36 includes a tapered core portion 39, the base and core being provided with a suction bore 40 and an exhaust bore 41. The valve member 42 may be rotatably mounted on the tapered core portion 39 and retained thereon by means of a conventional washer 43 and nut 44 threaded to core portion 39 as shown in Fig. 2. The rotatable valve member 42 is provided with a suction bore 46 and an exhaust bore 47.

The pump 35 may be mounted on the rotatable valve member 42 by means of a curved tube 49 secured to valve member 42 in alignment with the suction bore 46 and by a second curved tube 50 mounted in the valve member 42 in alignment with the exhaust bore 47. The ends of tubes 49 and 50 may be fastened in conventional manner to head members 52 and 53 which, in conjunction with column members 54 and 55 respectively, support a cylinder 56 with its ends sealed with respect to atmosphere. The cylinder 56 may be in the form of a glass tube and a glass disc or piston member 57 may be fitted within cylinder 56 to provide the action of a piston in the same manner as conventionally provided in syringes. A scale 58 is marked on cylinder 56 thereby to provide an indication of the volume of air sucked into the cylinder by the piston 57.

A sample counter 60 may be mounted on a bracket 37 above valve 34 and may include a rotatable disc 61 having fingers 62 projecting outwardly thereof for engagement with the pins 63 mounted in the valve 42. Thus, as the pump 35 rotates on valve 34 through 180°, one of the pins 63 will engage one of the fingers 62 to rotate the disc 61 through a predetermined angle to indicate a pumping cycle. A spring catch 65 may also be mounted on bracket 37 for the purpose of holding pump 35 in a vertical position.

In operation the sealed ampoule 16 may be fractured at its tip and mounted on clip 14 with the hose connection 20 placed thereon in sealed relation thereto. This provides a fresh supply of reagent. The breath sampling bag 22 is then utilized by the subject being tested by repeatedly exhaling and inhaling, or rebreathing breath into and out of the bag. After a number of exhalations by the subject it is found that a useable sample of alveolar breath will be contained within the bag. The bag is then sealed to the sampling tube 21 and valve 24 may be adjusted to provide a direct connection from tube 25 to tube 32. The pump 35 normally will have the piston 57 at its lowermost position and therefore pump 35 may be rotated through 180° to lift the piston to an uppermost position.

The force of gravity then causes downward movement of piston 57 and it draws a portion of the breath sample through the reagent in the ampoule 16. The pump 35 may then be rotated through another 180° to repeat the pumping operation. It will be noted that the rotation of cylinder 35 always connects the suction end of pump 35 with the suction bore 40 and the valve always connects the exhaust end of pump 35 with the exhaust bore 41. Also, every cycle of the pump is counted by counter 60 and by multiplying the numeral shown on the counter by the reading on scale 58, for example 100 cu. centimeters, the total volume of alveolar breath drawn through ampoule 16 may be obtained.

The pump 35 is operated through one cycle after another until a color change occurs in the reagent within ampoule 16, provided of course that the subject has imbibed an alcoholic beverage.

When the color change occurs, the operation of pump 35 and the movement of piston 57 may be stopped by closing the valve 24 thereby to cut off flow of breath into the cylinder 35. Thus by utilizing the scale marked on the exterior of the piston the exact volume of breath drawn into the cylinder during a partial stroke of the piston is obtained. As mentioned before, whole cycles of the pump are counted by counter 60 and therefore the total amount of breath necessary to obtain the predetermined color change is indicated by multiplying the numeral shown on the counter by the total volume of cylinder 35 and adding the reading shown by the partial stroke of the piston.

It has been found by experiment that blood carries alcohol to the lungs and in this way the alcohol finds its way through the breath. The proportion between the blood alcohol content of the human blood and the alcohol content of alveolar breath is 2100 to 1 at body temperature. 2100 cu. centimeters of expired alveolar breath contain the same amount of alcohol as one cu. centimeter of blood. 3200 cu. centimeters of ordinary breath contain 2100 cu. centimeters of alveolar breath, and this quantity of alveolar breath contains 190 grams of carbon dioxide.

Knowing these facts the ampoule 16 may be partially filled with a reagent consisting of 10 cu. centimeters of 16 normal solution of sulphuric acid and one cu. centimeter of one-twentieth normal solution of potassium permanganate. This reagent is disclosed by way of example. The sulphuric acid serves to remove any alcohol present in the breath and hold it in solution. This reagent has a purple color that will be discolorized and show an end point if and when .169 of a milligram of alcohol is absorbed by the sulphuric acid.

As stated previously, ampoule 17 contains a solution of a standard yellow color and ampoule 18 carries a solution having a standard pink color. When the end point of .169 milligram of alcohol is reached by the reagent, the reagent will have a color between the standard yellow and the standard pink.

The amount of breath which contains .169 milligram of alcohol varies inversely in proportion to the alcohol concentration in the breath and, therefore, indirectly in the blood. With the established data, the amount of breath containing .169 milligram alcohol is measured by repeated operation of pump 35. The amount of alcohol in 2100 cu. centimeters of alveolar breath, the equivalent of one cu. centimeter of blood, can be computed by the following formula:

$$\frac{.169 \text{ mg. alcohol}}{\text{Vol. of breath used}} = \frac{X}{2100 \text{ cc. rebreathed air}}$$

$$X = \text{blood alcohol}$$

Computation of the above formula shows the amount of blood alcohol in milligrams per cu. centimeter. It has been established that below 0.05% of alcohol is indicative of no influence by alcohol within the meaning of the law. Between 0.05 and 0.15% alcoholic influence is indicated but individual tolerance of alcohol and behavior of the individual must be considered before determining whether a person is under the influence of alcohol. When there is 0.15% or more of alcohol in the blood there is clear evidence that a person is under the influence of alcohol regardless of individual tolerance or other pertinent circumstances. These percentages of alcohol have been determined by extended experiments with human beings of many types. Thus the formula specified above may be utilized to determine accurately the alcoholic content of a person's blood.

It should be understood that the above-described test can be performed without using the dehydrite tube 27 and the ascarite tube 29 and hence this apparatus may be omitted when it is desired to determine alcoholic content by the use of color comparison and volume alone.

An alternative method of determining alcoholic content of the blood comprises the steps of setting valve 24 to feed breath from bag 22 through the dehydrite tube 26 and the ascarite tube 29. The moisture is removed from the air by the dehydrite tube 26. The carbon dioxide from the breath is absorbed by the ascarite tube. This tube is weighed before and after the test and the weight of the carbon dioxide from the alveolar breath containing .169 milligram of alcohol is thus determined. From this the amount of alcohol in the alveolar breath containing 190 milligrams of carbon dioxide, representing 2100 cc. of alveolar breath, can be computed by the following formula:

$$\frac{.169 \text{ mg. of alcohol}}{\text{Wt. of } CO_2} = \frac{X}{190 \text{ mg. } CO_2}$$

$$X = \text{blood alcohol}$$

From the foregoing description it will be apparent that this invention provides apparatus which is simple to operate and completely accurate. The gravity operated pump 35 together with the counter 60 make it possible to obtain a highly accurate reading of alveolar breath utilized in the test. The pump itself is economical in manufacture and foolproof in operation. It has the distinct advantage that flow of air may be stopped within the apparatus at the precise end point of the test which is the point at which a complete color change in the reagent can be noticed. Valve 24 may be closed at this end point and the piston 57 automatically stops its downward movement thereby to show the precise number of cu. centimeters of air pumped during a partial stroke. In addition, the pump includes a simple two-way valve which operates automatically in response to rotation of the pump.

A further advantage of this invention resides in the fact that the amount of alcohol in the human breath may be tested without a determination of the carbon dioxide content of the breath used in the test. Thus, it is not necessary to weigh the Ascarite tube, and it is not even necessary to provide the dehydrating tube and the Ascarite tube as a part of the apparatus. By providing a non-elastic container, it is possible to obtain a breath sample which is almost entirely alveolar breath, and the formula for computing alcoholic content of the blood which has been set forth herein on page 10 is applicable. The alveolar air-blood ratio is approximately 1:2100 as established by the authorities presented in "Evaluating Chemical Tests For Intoxication," a report of the Committee on Tests for intoxication of the National Safety Council, 425 North Michigan Avenue, Chicago 11, Illinois, March 6, 1952. A description of the theory involved in computing the quantity of blood alcohol by means of the tests described herein is found in the Journal of Laboratory and Clinical Medicine, volume 36, No. 2, pages 306–318, August 1950.

The invention claimed is:

1. Apparatus for measuring the alcoholic content of human breath, comprising a collapsible non-elastic container for holding a sample of breath under atmospheric pressure, means coupled to said container for removing any alcohol contained in said breath and color changeable to a predetermined degree in response to a predetermined amount of alcohol, a metering pump coupled to said alcohol-removing means for drawing breath from said container through said means, said pump having a transparent cylinder of fixed length and normally disposed vertically, a measuring scale on the outer surface of said cylinder, a gravity movable piston therein for drawing a fixed quantity of breath through said means during each downward stroke, means for supporting said cylinder in a vertical plane for rotation about a horizontal axis whereby said cylinder may be rotated 180° at a time to cause repeated strokes of said piston, said supporting means comprising a rotatable two-way valve coupled to each end of said cylinder for opening the lower end thereof to atmosphere and the upper end thereof to said alcohol-removing means whereby said pump may be operated through successive strokes to measure the amount of breath necessary to produce said color change, and a valve coupled between said alcohol removing means and said two-way valve for stopping flow of gas into said cylinder and for stopping motion of said piston at points intermediate the ends of said scale to provide fractional strokes of said piston and fractional volume readings on said scale corresponding to the stopped positions of said piston.

2. Apparatus for measuring the alcoholic content of human breath, comprising a container for holding a sample of breath under atmospheric pressure, means coupled to said container for removing any alcohol contained in said breath and color changeable to a predetermined degree in response to a predetermined amount of alcohol, a metering pump coupled to said alcohol-removing means for drawing breath from said container through said means, said pump having a transparent cylinder of fixed length and normally disposed vertically, a measuring scale on the outer surface of said cylinder, a gravity movable piston therein for drawing a fixed quantity of breath through said means during each downward stroke, means for supporting said cylinder in a vertical plane for rotation about a horizontal axis whereby said cylinder may be rotated through successive cycles to cause repeated strokes of said piston, said supporting means including valve means coupled to each end of said cylinder for opening the lower end thereof to atmosphere and the upper end thereof to said alcohol-removing means whereby said pump may be operated through successive strokes to measure the amount of breath necessary to produce said color change, and a valve coupled between said alcohol removing means and said valve means for stopping flow of gas into said cylinder and for stopping motion of said piston at points intermediate the ends of said scale to provide fractional strokes of the said piston and fractional volume readings on said scale corresponding to the stopped positions of said piston.

3. In an apparatus for measuring the alcoholic content of human breath, a collapsible non-elastic container for holding a sample of breath under atmospheric pressure, means coupled to said container for removing alcohol from said breath and indicating a predetermined amount of alcohol, a metering pump coupled to said container for drawing breath from said container through said means, said pump having a transparent cylinder normally disposed vertically, a measuring scale on the outer surface of said cylinder, a gravity movable piston therein for drawing a fixed quantity of breath through said means during each downward stroke, means for supporting said cylinder in a vertical plane for rotation about a horizontal axis whereby said cylinder may be rotated 180° at a time to cause repeated strokes of said piston, said supporting means comprising a rotatable two-way valve coupled to each end of said cylinder for opening the lower end thereof to atmosphere and the upper end thereof to said container whereby said pump may be operated through successive strokes, and valve means between said container and said pump for closing the inlet to said pump and stopping said piston at any time at points intermediate the ends of said scale to provide fractional strokes of said piston and fractional volume readings on said scale corresponding to the stopped positions of said piston.

4. A gravity operated metering pump comprising a transparent cylinder normally disposed in a vertical position and having a measuring scale on its outer surface, a gravity movable piston slidably supported within said cylinder for drawing a fixed quantity of gas into said cylinder during each stroke; means for supporting said cylinder in a vertical plane for rotation about a horizontal axis whereby said cylinder may be rotated through successive cycles of 180° to cause repeated strokes of said piston, said supporting means comprising a rotatable two-way valve assembly having a stationary core with diametrically opposed suction and exhaust ports therein, a valve sleeve member rotatably mounted on said core and including ports aligned with the ports in said core for opening and closing said core ports; tubular means connecting the ports of said valve to each end of said cylinder and supporting said cylinder on said valve; and a valve connected to said core suction port for stopping flow of gas into said cylinder and for stopping motion of said piston at points intermediate the ends of said scale to provide fractional strokes of said piston and fractional volume readings on said scale corresponding to the stopped positions of said piston.

5. A gravity operated metering pump comprising a transparent cylinder normally disposed in a vertical position and having a measuring scale on its outer surface, a gravity movable piston slidably supported within said cylinder for drawing a fixed quantity of gas into said cylinder during each stroke; means for supporting said cylinder in a vertical plane for rotation about a horizontal axis whereby said cylinder may be rotated through successive cycles to cause repeated strokes of said piston, said supporting means comprising a rotatable two-way valve assembly having a core with suction and exhaust ports therein, a valve sleeve member mounted on said core and including ports aligned with the ports in said core for opening and closing said core ports; tubular means connecting the ports of said valve to each end of said cylinder and supporting said cylinder on said valve.

6. A gravity operated metering pump comprising a transparent cylinder normally disposed in a vertical position and having a measuring scale on its outer surface, a gravity movable piston slidably supported within said cylinder for drawing a fixed quantity of gas into said cylinder during each stroke; means for supporting said cylinder in a vertical plane for rotation about a horizontal axis whereby said cylinder may be rotated through successive cycles to cause repeated strokes of said piston, said supporting means comprising a valve assembly having a suction port therein, tubular means connecting said valve to each end of said cylinder and supporting said cylinder on said valve; and a valve connected to said suction port for stopping flow of gas into said cylinder and for stopping motion of said piston at points intermediate the ends of said scale to provide fractional strokes of said piston and fractional volume readings on said scale corresponding to the stopped positions of said piston.

7. A gravity operated metering pump comprising a transparent cylinder bearing measuring scale and normally disposed in a vertical position, a gravity movable piston slidably supported within said cylinder for drawing a fixed quantity of gas into said cylinder during each stroke, means for supporting said cylinder in a vertical plane for rotation about a horizontal axis whereby said cylinder may be rotated through successive cycles to cause repeated strokes of said piston, and valve means connected to said cylinder for stopping flow of gas into said cylinder and for stopping motion of said piston at points intermediate the ends of said scale to provide fractional strokes of said piston and fractional volume readings on said scale corresponding to the stopped positions of said piston.

8. A gravity operated metering pump comprising a transparent cylinder normally disposed in a vertical position and having a measuring scale on its outer surface, a gravity movable piston slidably supported within said cylinder for drawing a fixed quantity of gas into said cylinder during each stroke, means for supporting said cylinder in a vertical plane for rotation about a horizontal axis whereby said cylinder may be rotated through successive cycles to cause repeated strokes of said piston, said supporting means comprising a rotatable valve assembly coupled to each end of said cylinder and supporting said cylinder on said valve, and valve means connected to said valve assembly for stopping flow of gas into said cylinder and for stopping motion of said piston at points intermediate the ends of said scale to provide fractional strokes of said piston and fractional volume readings on said scale corresponding to the stopped positions of said piston.

9. A gravity operated metering pump comprising a transparent cylinder bearing a measuring scale on its outer surface and normally disposed in a vertical position, a gravity movable piston slidably supported within said cylinder for drawing a fixed quantity of gas into said cylinder during each stroke, means for supporting said cylinder in a vertical plane for rotation about a horizontal axis whereby said cylinder may be rotated through successive cycles to cause repeated strokes of said piston, said supporting means comprising a rotatable valve assembly, and means for supporting said cylinder on said valve, a counter operatively associated with said supporting means for counting successive cycles of said cylinder, and valve means connected to said valve assembly for stopping flow of gas into said cylinder and for stopping motion of said piston at points intermediate the ends of said scale to provide fractional strokes of said piston and fractional volume readings on said scale corresponding to the stopped positions of said piston.

References Cited in the file of this patent

UNITED STATES PATENTS

| | | |
|---|---|---|
| 210,943 | Harvey et al. | Dec. 17, 1878 |
| 508,921 | Dalisch | Nov. 21, 1893 |
| 1,945,962 | Arneth | Feb. 6, 1934 |
| 2,007,330 | Hicks | July 9, 1935 |
| 2,062,785 | Harger | Dec. 1, 1936 |
| 2,304,033 | Shelton | Dec. 1, 1942 |
| 2,306,751 | Reymond | Dec. 29, 1942 |
| 2,591,691 | Forrester | Apr. 8, 1952 |

FOREIGN PATENTS

| | | |
|---|---|---|
| 22,727 | Germany | June 15, 1883 |
| 176,116 | Germany | of 1906 |